US011187236B2

(12) United States Patent
Jaenike

(10) Patent No.: US 11,187,236 B2
(45) Date of Patent: Nov. 30, 2021

(54) EXHAUST GAS TURBOCHARGER

(71) Applicant: IHI CHARGING SYSTEMS INTERNATIONAL GMBH, Amt Wachsenburg ot Ichtershausen (DE)

(72) Inventor: Lorenz Jaenike, Heidelberg (DE)

(73) Assignee: IHI CHARGING SYSTEMS INTERNATIONAL GMBH, Amt Wachsenburg ot Ichtershausen (DE)

( * ) Notice: Subject to any disclaimer, the term of this patent is extended or adjusted under 35 U.S.C. 154(b) by 0 days.

(21) Appl. No.: 16/832,042

(22) Filed: Mar. 27, 2020

(65) Prior Publication Data
US 2020/0224665 A1  Jul. 16, 2020

Related U.S. Application Data

(63) Continuation-in-part of application No. PCT/EP2018/000452, filed on Sep. 26, 2018.

(30) Foreign Application Priority Data

Oct. 12, 2017 (DE) ..................... 10 2017 123 818.2

(51) Int. Cl.
F04D 29/056 (2006.01)
F02B 37/00 (2006.01)
F02B 37/02 (2006.01)

(52) U.S. Cl.
CPC ............ *F04D 29/056* (2013.01); *F02B 37/00* (2013.01); *F02B 37/025* (2013.01)

(58) Field of Classification Search
CPC ........ F01D 25/16; F01D 25/166; F01D 25/18; F01D 25/186; F01D 9/02; F01D 9/026;
(Continued)

(56) References Cited

U.S. PATENT DOCUMENTS 4,351,154 A * 9/1982 Richter ................. F01N 13/107
60/605.1
8,317,400 B2 * 11/2012 Petitjean ................. F16C 27/02
384/99

(Continued)

FOREIGN PATENT DOCUMENTS

DE           102 38 415 A1    3/2004
DE    10 2007 058 296 A1    6/2009
(Continued)

OTHER PUBLICATIONS

WO2004018843 Translation; Mar. 2004 ; Baar Roland; WO.*
(Continued)

*Primary Examiner* — Jesse S Bogue
(74) *Attorney, Agent, or Firm* — Ronald S. Lombard

(57) ABSTRACT

The invention relates to an exhaust gas turbocharger with a manifold-flow casing, in particular a dual-flow casing (47) and a turbine wheel (34) which is rotatably arranged within said manifold-flow casing, onto which an exhaust gas flow (14; 16) may be led via at least one of several flow channels (18, 26), and an outlet opening (78; 80) following said one flow channel (18, 26) and covering an angle of 180° max. about an axis of rotation (44) of the turbine wheel (34), so that a shaft (38) is rotating which is arranged coaxially and non-rotationally relative to the turbine wheel (34), which is supported in a shaft bearing (42).

7 Claims, 3 Drawing Sheets

(58) Field of Classification Search
CPC ...... F02B 37/00; F02B 37/025; F04D 29/056; F05D 2220/40; F16C 17/028; F16C 2360/24; F16C 33/1045; F16C 33/1075
See application file for complete search history.

(56) References Cited

U.S. PATENT DOCUMENTS

| | | | | |
|---|---|---|---|---|
| 9,429,162 | B2* | 8/2016 | Houst | F01D 9/026 |
| 9,726,189 | B2* | 8/2017 | Nishida | F01D 25/186 |
| 10,393,010 | B2* | 8/2019 | Ueda | F16C 27/02 |
| 10,450,887 | B2* | 10/2019 | Higashimori | F02B 37/025 |
| 10,557,498 | B1* | 2/2020 | Bischof | F16C 17/18 |
| 10,890,105 | B2* | 1/2021 | Takashima | F02C 6/12 |
| 2007/0003175 | A1* | 1/2007 | Petitjean | F16C 17/02 384/322 |
| 2014/0165559 | A1* | 6/2014 | Lotterman | F01D 9/026 60/605.1 |
| 2016/0281535 | A1* | 9/2016 | Koehl | F16C 17/18 |

FOREIGN PATENT DOCUMENTS

| | | |
|---|---|---|
| DE | 10 2010 010 319 A1 | 9/2011 |
| DE | 10 2010 023 475 A1 | 12/2011 |
| DE | 10 2011 016 528 A1 | 1/2012 |
| DE | 10 2013 017 145 A1 | 7/2014 |
| DE | 11 2016 003 200 T5 | 4/2018 |
| EP | 3 064 721 A1 | 9/2016 |
| WO | WO-2004018843 A2 * | 3/2004 ......... F16C 33/1045 |

OTHER PUBLICATIONS

The International Search Report for the corresponding international application No. PCT/EP2018/000452, dated Nov. 15, 2018, in the German language (3 pages).

The English translation of the International Search Report for the corresponding international application No. PCT/EP2018/000387 (3 pages).

DE 11 2014 005 008 T5; Published Jul. 28, 2016; Germany; No Translation.

DE 2013 021 567 A1; Published Jul. 31, 2014; Germany; No Translation.

DE 10 2006 033 397 A1; Published Jan. 24, 2008; Germany; No Translation.

EP 2 693 017 A1; Published Feb. 5, 2014; EPO.

EP 2 362 080 B1; Published Oct. 28, 2015; EPO.

* cited by examiner

EXHAUST GAS TURBOCHARGER

CROSS-REFERENCE TO RELATED APPLICATIONS

This is a continuation-in-part application of pending international patent application PCT/EP2018/000452 filed Sep. 26, 2018, and claiming the priority of German patent application No. 10 2017 123 818.2 filed Oct. 12, 2017. The said International patent application PCT/EP2018/000452 and German patent application No. 10 2017 123 818.2 are both incorporated herein by reference in their entireties as though fully set forth.

BACKGROUND OF THE INVENTION

The invention relates to an exhaust gas turbocharger of the type indicated in the preamble of Claim 1.

From laid open patent application DE 11 2014 005 008 T5, an exhaust gas turbocharger is already known with a dual flow casing and a turbine wheel which is rotatably arranged therein, onto which exhaust gas flows may be led via several flow channels and outlet openings following said flow channels, so that a shaft is rotating which is arranged coaxially and non-rotationally relative to the turbine wheel, which is supported in a shaft bearing, wherein at least one of the outlet openings covers an angle of 180° maximum about the axis of rotation of the turbine wheel.

DE 10 2013 021 567 A1 relates to another exhaust gas turbocharger with a dual flow casing.

DE 10 2006 033 397 A1 discloses an exhaust gas turbocharger with a shaft bearing which is implemented as a multi-surface radial plain bearing, on whose inside either two or three corresponding bearing surfaces are provided. The multi-surface radial plain bearing is implemented as a co-rotating shaft bearing with an outer damping gap between the shaft bearing and a casing. In addition, another embodiment is disclosed, with the shaft bearing having a reduced radial and pivotable movability relative to the casing. In another embodiment, the shaft bearing is exclusively radially movable relative to the casing. In another embodiment, the shaft bearing is further provided with at least one circumferential groove at the outer circumference for limiting the rotatability, into which a locking means engages which connects the shaft bearing with the casing, so an essentially non-rotational arrangement of the shaft in the casing may be achieved with comparable low expenditure.

EP 2 693 017 A1 relates to an exhaust gas turbocharger with two floating shaft bearings for a shaft which connects a turbine wheel of an exhaust gas turbocharger with its compressor wheel. The floating shaft bearings are implemented as multi-surface radial plain bearings, each with a circumferential gap both opposite the casing and the shaft, so that an oil film is formed at the inner surface and the outer surface of the respective shaft bearing. The gaps and the oil films enable the rotation of the shaft within the shaft bearing and the rotation of the shaft bearing within the casing. Multi-surface radial plain bearings in various embodiments are proposed, which also include a two-surface, a three-surface and a four-surface radial plain bearing with corresponding bearing surfaces.

For the exhaust gas turbocharger according to EP 2 362 080 B1, there is also a multi-surface radial plain bearing provided, which is referred to as "floating", wherein this shaft bearing comprises a circumferential gap relative to a bearing housing of the exhaust gas turbocharger, so that an oil film is formed at the outer surface of the shaft bearing, which enables the rotation of the shaft bearing relative to the bearing housing.

For automotive power trains, the above-mentioned exhaust gas turbochargers with a dual-flow casing have proven advantageous with respect to the pulse-charging capability. This good pulse-charging capability may however—depending on the design of the exhaust gas turbocharger—be counteracted by a drawback, namely the possible occurrence of vibrations which may be generated because alternating exhaust gas flows are introduced into the turbine. This may lead to vibrations and to an associated running noise which, depending on the noise level of the remaining components of the power train is noticeable. Because modern power train systems operate very quietly, there is a need to reduce the running noise of the exhaust gas turbocharger as well.

It is therefore the object of the present invention to create an exhaust gas turbocharger which operates quietly despite of its pulse-charging capability.

SUMMARY OF THE INVENTION

This object is solved by an exhaust gas turbocharger with the characteristics of Claim 1. Advantageous embodiments with suitable and non-trivial developments of the invention are indicated in the remaining claims.

According to the invention, the shaft bearing is provided as a multi-surface radial plain bearing, the number of bearing surfaces being either equal to the number of the flow channels or an integer multiple of the number of the flow channels.

Thus, the number of the bearing surfaces of the multi-surface radial plain bearing is obtained as product from a multiplication, in which the number of flow channels is multiplied by a positive integer factor. In particular, this factor may be one or two, but also three or an even greater factor.

The inventive use of a multi-surface radial plain bearing in a manifold-flow casing allows to assign a certain number of bearing surfaces to a certain number of flow channels, so that each of the radial forces which act from varying directions, may definitely be assigned a certain bearing surface. Thereby, the multi-surface radial plain bearing may be dimensioned and/or arranged in such a manner that the radial forces are always optimally supported.

As such, the inventive numerical ratio between flow channels and bearing surfaces may also reduce potential vibrations and the wear of the shaft bearings.

The reduction of bearing wear enables in an especially advantageous manner to use merely one single shaft bearing in lieu of two shaft bearings which are axially offset to each other, so that the exhaust gas turbocharger may be correspondingly short and requires little axial installation space, respectively. With such a design, an axial bearing may absorb the axial forces which act on the compressor wheel and the turbine wheel. However, for supporting the shaft, a multi-surface radial plain bearing adjacent to the turbine wheel and a conventional plain or anti-friction bearing adjacent to the compressor wheel may be provided. Within the scope of the invention, it is also possible to use two multi-surface radial plain bearings for supporting the shaft.

By using an exhaust gas turbocharger with a manifold-flow casing, where the outlet opening of the one flow channel covers an angle of 180° maximum about an axis of rotation of the turbine wheel, the pulse-charging capability, for example compared to exhaust gas turbochargers with a 360° circumferential outlet opening of the flow channel, is enhanced on the one hand. But also compared to exhaust gas turbochargers with a twin-flow casing with 360° circumferential outlet openings of the two flow channels, the pulse-charging capability is enhanced.

It is not mandatory to provide two outlet openings which cover an angle of 180° maximum about an axis of rotation of the turbine wheel. For example, also three outlet openings may be provided, each of which covering an angle of just 120° or an outlet angle of 120° relative to each other, respectively. With such circumferentially uniform distributions of the outlet openings or of the outlet angles of the flow channels, respectively, it is advantageous if the bearing surfaces of the multi-surface radial plain bearing are also formed consistent with respect to the shape and a distance to the bearing center axis.

Alternatively, it is also possible to asymmetrically arrange the outlet openings and/or the outlet angles of the flow channels; for example as angles of 120°, 200° and 40°, so that in total 360° result.

In a particularly advantageous embodiment of the invention, the damping function of a floating arrangement of the multi-surface radial plain bearings in the bearing housing is deliberately dispensed with in favor of an optimum support of said radial forces at the shaft bearing, where the multi-surface radial plain bearing typically rotates at approximately half the shaft speed. In contrast, with the advantageous embodiment of the invention, the multi-surface radial plain bearing is non-rotationally defined relative to the bearing housing. Thus, it may be provided that the bearing surfaces of the multi-surface radial plain bearings are defined in their circumferential position about a bearing center axis relative to a bearing housing which is non-rotationally connected or integral with the manifold-flow casing, wherein at least one of the bearing surfaces is arranged in such a manner that a radial force which acts on the shaft due to a one-sided application of the exhaust gas flow, is supported on the one bearing surface in a direction in which the multi-surface radial plain bearing exhibits the maximum bearing stiffness.

In a particularly advantageous constructive implementation, the manifold-flow casing may be provided as a dual-flow casing and the two outlet openings each of the flow channels may cover an angle slightly below 180° each and the multi-surface radial plain bearing may be a four-surface bearing at whose two largest inner diameters a plane with the bearing center axis may be extended, which intersects an interface under an angle of intersection of approx. 45° about the bearing center axis between the two outlet openings. However, this angle of intersection may also vary by up to 15° in the direction of rotation and against the direction of rotation of the shaft.

The non-rotational arrangement of the shaft bearing within the bearing housing allows to align the lubricant ducts and openings of shaft bearing and bearing housing opposite to one another that a complicated inner ring groove for the distribution of the oil from the supply duct in the bearing housing to the corresponding openings in the multi-surface radial plain bearing is not required. As such, it may be provided in an advantageous embodiment of the invention that the multi-surface radial plain bearing comprises several lubricant pockets which extend in parallel to the bearing center axis and into which a radial recess each is leading which is in permanent alignment with a supply duct in the bearing housing when the shaft is rotating.

Because the circumference of the shaft bearing is fixed to the bearing housing, a bearing sleeve may be omitted, and it may be provided that the bearing surfaces of the multi-surface radial plain bearing are directly incorporated into the bearing housing. Alternatively, the multi-surface radial plain bearing may comprise a bearing sleeve which is non-rotationally defined relative to the bearing housing.

BRIEF DESCRIPTION OF THE DRAWINGS

Further advantages, features and details of the invention result from the following description of preferred exemplary embodiments as well as from the drawings. The above mentioned features and feature combinations in the description of the figures as well as the following features and feature combinations in the description of the figures and/or shown in the figures alone are not only applicable in the indicated combination but also in other combinations or alone, without deviating from the scope of the invention. In the drawings.

DETAILED DESCRIPTION OF THE INVENTION

Figure 1:
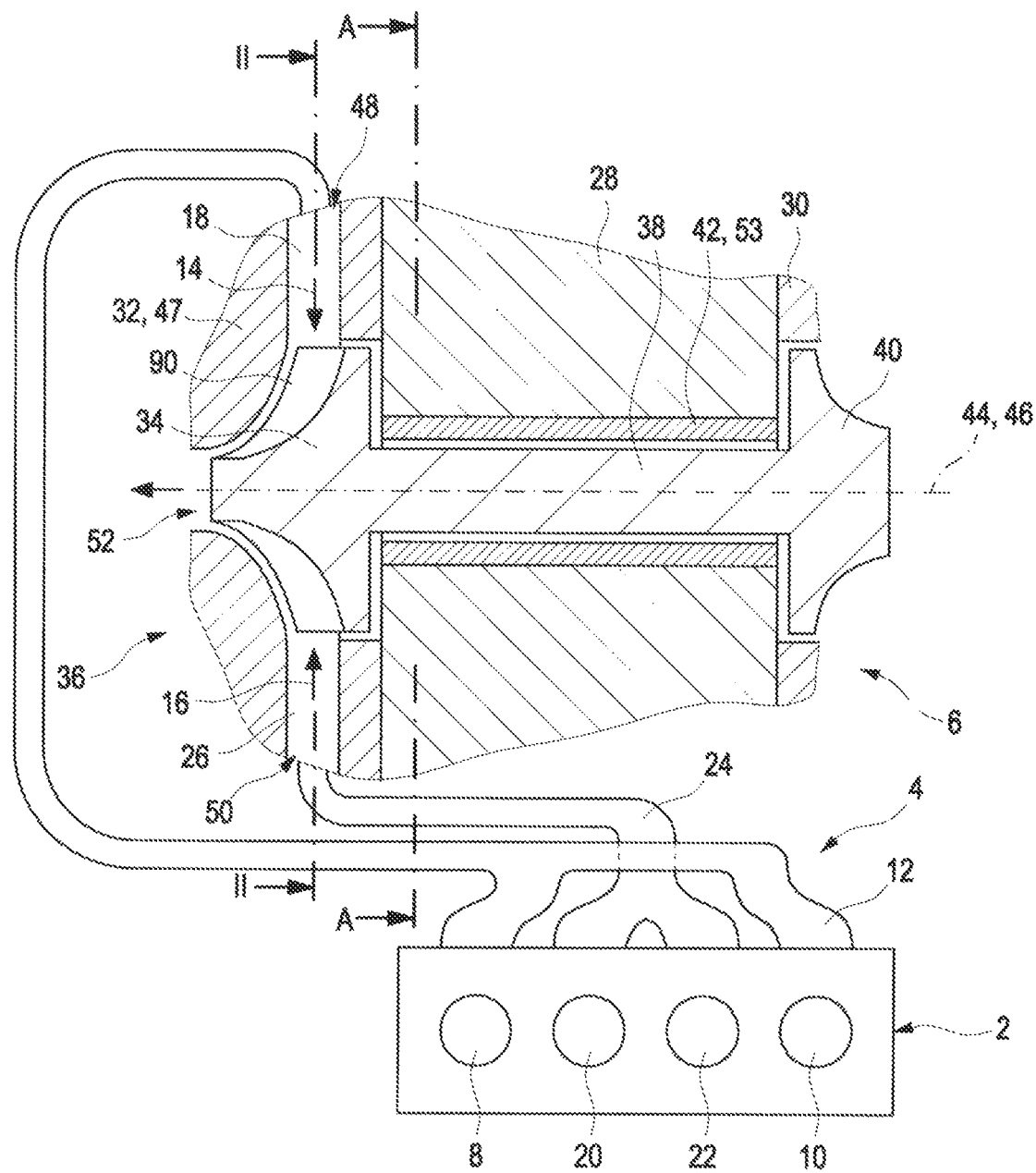
FIG. 1 schematically illustrates a combustion reciprocating piston engine with an exhaust system which is followed by an exhaust gas turbocharger.

FIG. 1 schematically illustrates a combustion reciprocating piston engine 2 with an exhaust system 4 which is followed by an exhaust gas turbocharger 6 which is depicted only partially.

The combustion reciprocating piston engine 2 is implemented as a four-cylinder in-line engine whose outer cylinders 8, 10 or combustion chambers, respectively, are combined in a first exhaust manifold 12, wherein the previously common first exhaust gas flow 14 is led into a first flow channel 18 of the exhaust gas turbocharger 6. However, the two inner cylinders 20, 22 or combustion chambers, respectively, are combined via a second exhaust manifold 24. The previously common second exhaust gas flow 16 is led into a second flow channel 26 of the exhaust gas turbocharger 6.

Thus, during operation of the exhaust gas turbocharger 6, the exhaust gas flows 14, 16 are led onto a turbine wheel 34 via the two flow channels 18, 26. Thereby, a shaft 38 and a compressor wheel 40 are set in rotation as will be described below. Consequently, the compressor wheel 40 provides charging air for the combustion reciprocating piston engine 2 in a manner not shown in detail.

The exhaust gas turbocharger 6 comprises a three-part casing with a bearing housing 28 which is arranged between a compressor casing 30 and a turbine casing 32 and is securely bolted with the latter. In the turbine casing 32 (only shown as a section) the turbine wheel 34 of a turbine 36 is rotatably arranged, which is non-rotationally connected via a shaft 38 with the compressor wheel 40 which is rotatably arranged in the compressor casing 30.

The shaft 38 is supported in the bearing housing 28 by means of a shaft bearing 42. The shaft extends along an axis of rotation 44 which ideally coincides with a bearing center axis 46 of the shaft bearing 42, i. e. which is arranged coaxially to the bearing center axis 46. The shaft 38 is flushed with oil and ideally rotates contactless and wear-free in the shaft bearing 42.

The turbine casing 32 is implemented as a dual-flow casing 47 which is a version of a manifold-flow casing. The dual-flow casing 47 comprises a first turbine inlet 48 and a second turbine inlet 50 each of which is associated with one of the two flow channels 18, 26, respectively, via which the exhaust gas flow 14, 16, respectively, is supplied to the turbine wheel 34, which is discharged from the dual-flow casing 47 via a turbine outlet 52 which is arranged coaxially to the turbine wheel 34 on a side facing away from the shaft 38.

The shaft 38 is non-rotationally connected at one end with the turbine wheel 34 and non-rotationally connected at the other end with the compressor wheel 40. The shaft bearing 42 for supporting the shaft 38 comprises a bearing sleeve 53 and is accommodated non-rotationally and axially secured in the bearing housing 28 by means of a press fit.

Figure 2:
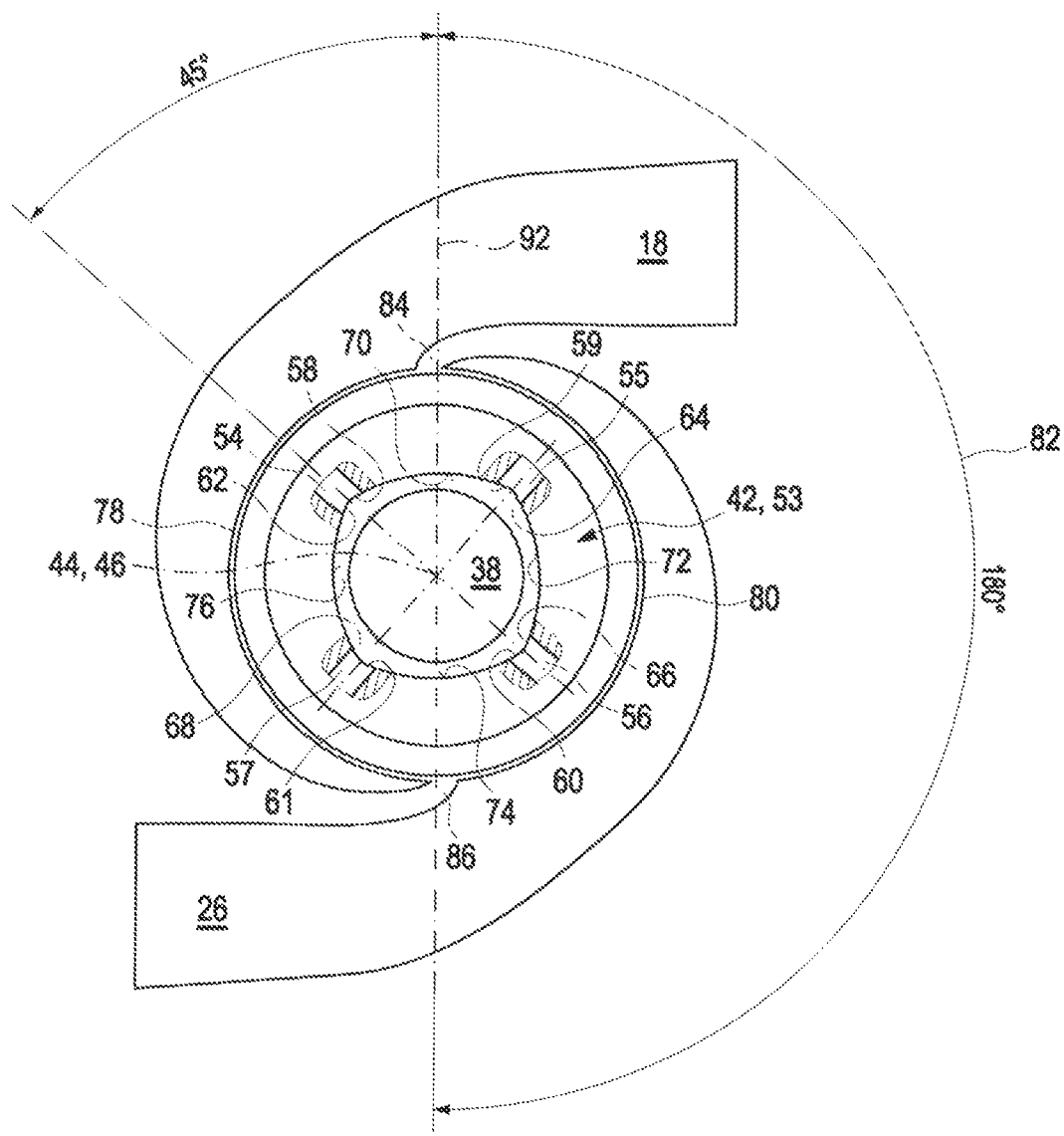
FIG. 2 shows the exhaust gas turbocharger from FIG. 1 in a section along line II-II in FIG. 1, wherein a breakout extends in the area of a multi-surface radial plain bearing along line A-A in FIG. 1.

From FIG. 2 it may be seen that the shaft bearing 42 is a multi-surface radial plain bearing which is implemented as a four-surface bearing and comprises four lubricant pockets, a first lubricant pocket 62, a second lubricant pocket 64, a third lubricant pocket 66 and a fourth lubricant pocket 68 which extend in parallel to the bearing center axis 46. Radial recesses, a first recess 58, a second recess 59, a third recess 60 and a fourth recess 61 of the shaft bearing 42, each of which in alignment with an associated supply duct, a first supply duct 54, or a second supply duct 55, or a third supply duct 56, or a fourth supply duct 57, respectively, are led into these lubricant pockets 62, 64, 66, 68, which are arranged in the bearing housing 28. Thus, the radial recesses 58, 59, 60, 61 are in permanent alignment with the associated supply ducts 54, 55, 56, 57 even with the shaft 38 rotating so that it is ensured that the shaft 38 during operation of the exhaust gas turbocharger 6 is completely surrounded by a lubricant film which separates the shaft 38 from four bearing surfaces, a first bearing surface 70, a second bearing surface 72, a third bearing surface 74 and a fourth bearing surface 76 of the multi-surface radial plain bearing, which are correspondingly formed in respect of shape and distance to the bearing center axis 46.

Because the four-surface bearing comprises the four bearing surfaces 70, 72, 74, 76, the number of the bearing surfaces 70, 72, 74, 76 of the multi-surface radial plain bearing is twice the number of the two flow channels 18, 26 which exhibit a spiral shape and lead the exhaust gas flows 14, 16 each via an outlet opening 78, 80 to the turbine 36.

Outlet openings of the flow channels 18, 26, a first outlet opening 78 and a second outlet opening 80, respectively, surround the turbine wheel 34 each under an angle 82 about the axis of rotation 44, which is slightly smaller than 180°. Consequently, the two outlet openings 78, 80 are arranged offset relative to one another at an angle of 180° about the axis of rotation 44. The two outlet openings 78, 80 are separated from each other by means of tongues, a first tongue 84 and a second tongue 86, respectively, which may be implemented according to the turbine disclosed in DE 10 2013 021 567 A1. Thereby an interface 92 is formed at which the two outlet openings 78, 80 and the two flow channels 18, 26, respectively, are essentially separated from each other. Near the tongues 84, 86, merely a small amount of exhaust gas flows between the blades 90 from the one flow channel 18 or 26, respectively, to the other flow channel 26 or 18, respectively, As may be seen in particular from FIG. 3, the interface 92 intersects a first plane 93 and a second plane 94 which are formed at the largest inner diameters of the shaft bearing 42. Thus, the interface 92 intersects the planes 93, 94 in the bearing center axis 46 so that an angle of intersection of approx. 45° results.

Figure 3:
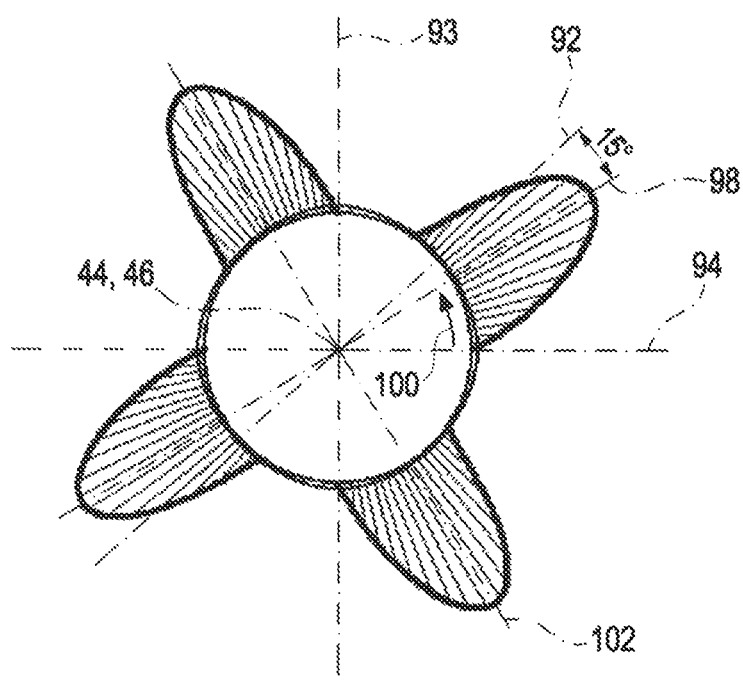
FIG. 3 shows the pressure profile at the multi-surface radial plain bearing according to FIG. 2, which is implemented as a four-surface radial plain bearing.

FIG. 3 shows the pressure profile at the four-surface radial plain bearing in its transverse plane. It is evident from the illustration that the pressure at the bearing surfaces does not have its maximum in the interface 92. Rather, the pressure has two maxima in a plane 98, which lie opposite the direction of rotation 100 of the shaft 38 and offset by an angle of intersection of appr. 15° relative to the bearing center axis 46. Furthermore, the pressure exhibits two additional maxima in another plane 102 which extends perpendicularly to the plane 98.

In an alternative exhaust gas turbocharger (not shown in the drawings) which comprises three flow channels a six-surface radial plain bearing is used.

What is claimed is:

1. An exhaust gas turbocharger with a manifold dual-flow casing (47) and a turbine wheel (34) which is rotatably arranged within said manifold dual-flow casing (47), onto which an exhaust gas flow (14; 16) is led via at least two flow channels (18, 26), and at least two outlet openings (78, 80) respectively following each of said at least two flow channels (18, 26) and each of said at least two outlet openings (78, 80) covering an angle of 180° maximum about an axis of rotation (44) of the turbine wheel (34), so that a shaft (38) having a circular cross-section is rotatably arranged coaxially and non-rotationally relative to the turbine wheel (34), the shaft (38) is supported in a shaft bearing (42), characterized in that the shaft bearing (42) has an inner circumferential surface having a non-circular shape extending in surrounding coaxial relationship with the shaft (38), the non-circular inner circumferential surface has a cross-sectional curvature which varies in a circumferential direction, the shaft bearing (42) is a multi-surface radial plain bearing with the non-circular inner circumferential surface comprising a number of discrete adjoining bearing surfaces (70, 72, 74, 76) which number is either equal to the number of the flow channels (18, 26) or an integer multiple of the number of the flow channels (18, 26), wherein the discrete adjoining bearing surfaces (70, 72, 74, 76) are oriented relative to the least two outlet openings (78, 80).

2. The exhaust gas turbocharger according to claim 1, characterized in that the discrete adjoining bearing surfaces (70, 72, 74, 76) are formed consistent with respect to the shape and a distance to a shaft bearing center axis (46).

3. The exhaust gas turbocharger according to claim 1, characterized in that the discrete adjoining bearing surfaces (70, 72, 74, 76) of the multi-surface radial plain shaft bearing (42) are further defined in their circumferential position about a shaft bearing center axis (46) relative to a bearing housing (28) which is non-rotationally connected or integral with the manifold-flow casing, wherein at least one of the discrete adjoining bearing surfaces (70, 72, 74, 76) is arranged such that a radial force, which acts on the shaft (38) due to a one-sided application of the exhaust gas flow, is supported at the least one of the discrete adjoining bearing surfaces (70, 72, 74, 76) in a direction in which the multi-surface radial plain shaft bearing (42) exhibits a maximum bearing stiffness.

4. The exhaust gas turbocharger according to claim 3, characterized in that the at least two outlet openings (78, 80) of the at least two flow channels (18, 26) each cover an angle (82) which is less than 180° and that the non-circular inner circumferential surface of the multi-surface radial plain shaft bearing (42) has four discrete adjoining bearing surfaces (70, 72, 74, 76), the cross-sectional curvature of the non-circular inner circumferential surface of the multi-surface radial plain shaft bearing (42) having a first of two largest inner diameters lying along a first plane (93) passing through the shaft bearing center axis (46) and having a second of two largest inner diameters lying along a second plane (94) passing through the shaft bearing center axis (46), the first plane (93) and the second plane (94) intersect at an interface (92) between the two outlet openings (78, 80) under an angle of intersection of about 45° with the shaft bearing center axis (46).

5. The exhaust gas turbocharger according to claim 1, characterized in that the multi-surface radial plain shaft bearing (42) comprises a bearing sleeve (53) which is non-rotationally defined relative to the bearing housing (28).

6. The exhaust gas turbocharger according to claim 1, characterized in that the multi-surface radial plain shaft bearing (42) further comprises several lubricant pockets (62, 64, 66, 68), each of the lubricant pockets (62, 64, 66, 68) formed proximate a juncture of each pair of discrete adjoining bearing surfaces (70, 72, 74, 76), each of the lubricant pockets (62, 64, 66, 68) extend in parallel relationship to the shaft bearing center axis (46) and each of the lubricant pockets (62, 64, 66, 68) leads into a respective radial recess (58; 59; 60; 61) which is in permanent alignment with a respective lubricant supply duct (54; 55; 56; 57) in the bearing housing (28) when the shaft (38) is rotating.

7. The exhaust gas turbocharger according to claim 3, characterized in that the discrete adjoining bearing surfaces (70, 72, 74, 76) of the multi-surface radial plain shaft bearing (42) are directly integrated into the bearing housing (28).

\* \* \* \* \*